(12) United States Patent
Rollinger et al.

(10) Patent No.: US 11,859,571 B2
(45) Date of Patent: Jan. 2, 2024

(54) METHODS FOR A ROAD SURFACE METRIC

(71) Applicant: Ford Global Technologies, LLC, Dearborn, MI (US)

(72) Inventors: John E. Rollinger, Troy, MI (US); Adam Richards, Royal Oak, MI (US); Robert Grant, Farmington Hills, MI (US); Steven Lin, Walnut, CA (US); Matthew Gerow, Alpena, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 178 days.

(21) Appl. No.: 17/443,169

(22) Filed: Jul. 21, 2021

(65) Prior Publication Data

US 2023/0021644 A1    Jan. 26, 2023

(51) Int. Cl.
| | |
|---|---|
| *F02D 41/02* | (2006.01) |
| *F02D 41/00* | (2006.01) |
| *G01P 15/00* | (2006.01) |
| *G01B 21/30* | (2006.01) |
| *G01P 3/00* | (2006.01) |
| *F02D 13/06* | (2006.01) |
| *B60W 40/068* | (2012.01) |
| *F02D 29/02* | (2006.01) |

(52) U.S. Cl.
CPC ......... *F02D 41/021* (2013.01); *B60W 40/068* (2013.01); *F02D 13/06* (2013.01); *F02D 29/02* (2013.01); *F02D 41/005* (2013.01); *F02D 41/0047* (2013.01); *F02D 41/0087* (2013.01); *G01B 21/30* (2013.01); *G01P 3/00* (2013.01); *G01P 15/00* (2013.01); *F02D 2200/50* (2013.01); *F02D 2200/702* (2013.01)

(58) Field of Classification Search
CPC ....... B60W 2520/10; B60W 2520/105; B60W 2520/12; B60W 2520/125; B60W 2520/14; B60W 2520/16; B60W 2520/18; B60W 2520/26; B60W 2520/263; B60W 2520/266; B60W 2552/05; B60W 2552/35; B60W 40/06; B60W 40/064; B60W 40/068; B60W 40/11; B60W 40/112; F02D 17/02; F02D 2200/025; F02D 2200/702; F02D 41/0047; F02D 41/005–0077; F02D 41/0087
See application file for complete search history.

(56) References Cited

U.S. PATENT DOCUMENTS 4,651,290 A * 3/1987 Masaki ................... B60T 8/173
                                                            701/41
5,103,397 A * 4/1992 Ikemoto ............... B60G 17/016
                                                            701/38

(Continued)

FOREIGN PATENT DOCUMENTS

WO    2010066541 A1    6/2010

*Primary Examiner* — John M Zaleskas
(74) *Attorney, Agent, or Firm* — Vincent Mastrogiacomo; McCoy Russell LLP

(57) ABSTRACT

Methods and systems are provided for estimation of a road roughness index (RRI) and adjusting vehicle operation based on the metric. In one example, a method may include estimating the RRI as a function of a pitch energy and a roll energy of the vehicle travelling on the road. In response to the RRI being higher than a threshold, engine operation such as EGR flow rate may be adjusted.

18 Claims, 6 Drawing Sheets

(56) References Cited

U.S. PATENT DOCUMENTS

| | | | | |
|---|---|---|---|---|
| 5,117,934 | A * | 6/1992 | Tsuyama | B60T 8/175 180/197 |
| 6,292,759 | B1 * | 9/2001 | Schiffmann | B60T 8/172 340/440 |
| 9,597,940 | B2 | 3/2017 | Anderson et al. | |
| 9,879,621 | B2 | 1/2018 | Glugla | |
| 10,173,677 | B2 | 1/2019 | Fairgrieve et al. | |
| 10,350,957 | B2 | 7/2019 | Anderson et al. | |
| 10,486,485 | B1 | 11/2019 | Levinson et al. | |
| 2001/0029421 | A1 * | 10/2001 | Watanabe | B60G 17/0165 701/79 |
| 2003/0236603 | A1 * | 12/2003 | Lu | B60G 17/0165 340/440 |
| 2004/0024509 | A1 * | 2/2004 | Salib | B60G 17/0162 701/45 |
| 2005/0065700 | A1 * | 3/2005 | Kogure | B60T 8/172 701/80 |
| 2006/0041353 | A1 * | 2/2006 | Sawada | B60W 10/08 701/37 |
| 2006/0136111 | A1 * | 6/2006 | Robert | F16H 61/66272 701/80 |
| 2007/0124053 | A1 * | 5/2007 | Lindskog | B60T 8/172 701/72 |
| 2007/0162202 | A1 * | 7/2007 | Moshchuk | B60W 40/114 701/38 |
| 2007/0162204 | A1 * | 7/2007 | Moshchuk | B60W 40/114 701/38 |
| 2007/0219698 | A1 * | 9/2007 | McDonald | F16H 61/0213 701/65 |
| 2008/0177437 | A1 * | 7/2008 | Asgari | B60W 50/045 701/33.9 |
| 2008/0183353 | A1 * | 7/2008 | Post | B60W 10/184 701/84 |
| 2009/0164060 | A1 * | 6/2009 | Fortson | B60R 21/0132 701/33.4 |
| 2010/0012072 | A1 * | 1/2010 | Leone | F02D 41/10 123/192.1 |
| 2012/0191316 | A1 * | 7/2012 | Leone | F02D 41/10 701/110 |
| 2012/0265402 | A1 * | 10/2012 | Post, II | B60W 40/064 701/38 |
| 2014/0005889 | A1 * | 1/2014 | Hayakawa | B60G 17/01933 701/37 |
| 2014/0163770 | A1 * | 6/2014 | Wakao | B60W 40/068 701/1 |
| 2014/0297116 | A1 | 10/2014 | Anderson et al. | |
| 2015/0073674 | A1 * | 3/2015 | Kelly | B60W 10/12 701/88 |
| 2015/0088368 | A1 * | 3/2015 | Varady | B60W 40/06 701/31.7 |
| 2015/0203115 | A1 * | 7/2015 | Fairgrieve | B60W 30/143 701/93 |
| 2015/0203116 | A1 * | 7/2015 | Fairgrieve | B60W 10/11 701/93 |
| 2016/0031444 | A1 * | 2/2016 | Fairgrieve | B22D 21/005 701/93 |
| 2016/0229252 | A1 * | 8/2016 | Lu | B60G 17/019 |
| 2016/0252023 | A1 * | 9/2016 | Srinivasan | F02D 41/2422 701/115 |
| 2017/0159587 | A1 * | 6/2017 | Glugla | F02D 35/027 |
| 2017/0159589 | A1 * | 6/2017 | Glugla | F02P 5/1504 |
| 2017/0370301 | A1 * | 12/2017 | Srinivasan | F02D 41/2422 |
| 2018/0058346 | A1 * | 3/2018 | Rollinger | F02D 41/26 |
| 2018/0105206 | A1 * | 4/2018 | Gullven | B62D 6/02 |
| 2018/0141543 | A1 | 5/2018 | Krosschell et al. | |
| 2018/0163647 | A1 * | 6/2018 | Glugla | F02P 5/1504 |
| 2018/0194356 | A1 * | 7/2018 | Richards | F02D 29/02 |
| 2018/0328292 | A1 * | 11/2018 | Srinivasan | F02D 41/0225 |
| 2018/0334162 | A1 * | 11/2018 | Lin | B60W 30/025 |
| 2019/0047573 | A1 * | 2/2019 | Herrera | B60W 40/109 |
| 2019/0256102 | A1 * | 8/2019 | Schleicher | E02F 9/2045 |
| 2020/0079356 | A1 * | 3/2020 | Lin | B60G 17/016 |
| 2020/0123987 | A1 * | 4/2020 | Dudar | F02D 13/06 |
| 2020/0355134 | A1 * | 11/2020 | Kelly | F02D 41/0085 |
| 2021/0274700 | A1 * | 9/2021 | Birkland | B60W 40/06 |
| 2021/0276565 | A1 * | 9/2021 | Birkland | B60W 40/06 |
| 2021/0282310 | A1 * | 9/2021 | Birkland | E01C 19/004 |
| 2021/0283973 | A1 * | 9/2021 | Birkland | B60W 40/06 |
| 2021/0284171 | A1 * | 9/2021 | Birkland | B60W 30/143 |
| 2021/0284172 | A1 * | 9/2021 | Birkland | B60W 40/112 |
| 2021/0370958 | A1 * | 12/2021 | Moshchuk | B60W 40/105 |
| 2022/0001715 | A1 * | 1/2022 | Murata | B60G 21/0558 |

* cited by examiner

METHODS FOR A ROAD SURFACE METRIC

FIELD

The present description relates generally to methods and systems for estimation of a road surface metric and adjusting vehicle operation based on the metric.

BACKGROUND/SUMMARY

Engines may be configured to include systems and measures to reduce fuel consumption and/or improve emissions quality. As one example, an engine may operate with a variable number of active or deactivated cylinders to increase fuel economy, while optionally maintaining the overall exhaust mixture air-fuel ratio about stoichiometry. This operation may be referred to as VDE (variable displacement engine) operation. In some examples, a portion of an engine's cylinders may be disabled during selected conditions, where the selected conditions can be defined by parameters such as a speed/load window, as well as various other operating conditions including vehicle speed. By reducing displacement under low torque request situations, the engine is operated at a higher manifold pressure, reducing engine friction due to pumping, and resulting in reduced fuel consumption. As another example, engine systems may utilize recirculation of exhaust gas from an engine exhaust system to an engine intake system, a process referred to as exhaust gas recirculation (EGR), to reduce regulated emissions. An EGR valve may be controlled to achieve a desired intake air dilution for the given engine operating conditions. The amount of EGR provided may be adjusted based on engine speed, engine temperature, and load during engine operation to maintain desirable combustion stability of the engine while providing emissions and fuel economy benefits. EGR effectively cools combustion chamber temperatures thereby reducing NOx formation. Also, EGR reduces pumping work of an engine resulting in increased fuel economy.

However, the inventors herein have recognized that the full fuel economy potential of EGR in an engine may be limited due to NVH issues associated with high EGR levels. Similarly, transitioning engine operation from a non-VDE (or full-cylinder) mode to a VDE (or reduced cylinder) mode, and vice-versa may produce disturbances in engine torque and may increase noise, vibration, and harshness (NVH) of the engine. The engine control systems may operate the engine with sub-optimal levels of EGR and disable transitioning in VDE operation to improve vehicle drivability and reduce operator dissatisfaction.

One example approach for adjusting engine operation such as EGR delivery based on NVH concerns is shown by Glugla in U.S. Pat. No. 9,879,621. Therein, EGR is regulated based on road roughness conditions such as EGR flow rate may be raised enabling NVH associated with elevated EGR levels to be masked by rough road conditions. The road roughness conditions are estimated based on inputs from a navigation system, vehicle to vehicle communication, and a plurality of vehicle sensors such as a crankshaft acceleration sensor, a wheel speed sensor, a suspension sensor, a steering sensor, and yaw sensor, etc.

However, the inventors herein have recognized potential issues with such systems. As one example the road roughness estimation outlined by Glugla does not elaborate how the output of different sensors are combined to determine the road roughness. Road roughness may affect outputs of different sensors differently and improper combining of the sensor outputs may provide an inaccurate road roughness estimation. Further, road roughness estimation carried out in a frequency domain may not provide information of a generic road surface variation over distance.

In one example, the issues described above may be addressed by a method for estimating a road roughness index (RRI) of a road based on one or more of a pitch energy and a roll energy of the vehicle travelling on the road, and in response to a higher than threshold road roughness, enabling a fuel economy mode of the vehicle. In this way, by estimating road roughness as a function of a plurality of sensor outputs over a distance, road roughness estimation accuracy may be improved.

As one example, for a vehicle, an acceleration of a vehicle along a longitudinal direction along the vehicle (pitch) may be estimated via a longitudinal acceleration sensor, acceleration of a vehicle along a latitudinal direction along the vehicle (roll) may be estimated via a latitudinal acceleration sensor, a yaw rate may be estimated via a yaw rate sensor, and a vehicle speed and a rate of vehicle speed change may be estimated via a vehicle speed sensor. Also, speed of rotation of each of the four wheels of the vehicle may be estimated. A pitch energy of the vehicle may be estimated based on the acceleration of a vehicle along the longitudinal direction and a rate of change of vehicle speed filtered over a distance. A roll energy of the vehicle may be estimated based on the acceleration of a vehicle along the latitudinal direction and a yaw rate of the vehicle filtered over a distance. Wheel speed deviation (impact) energy for each of the four wheels may be computed based on average speed of each wheel over a distance. A road roughness index may be estimated as a weighted combination of each of the pitch energy of the vehicle, the roll energy of the vehicle, and wheel speed deviation energy for each wheel. In comparison, during rougher road conditions, EGR flow may be opportunistically raised to or above a target level. During a higher than threshold rough road index, one or more other engine operating parameters that improve fuel economy at the cost of combustion stability or NVH can be adjusted, such as increasing EGR flow rate, activating VDE mechanism, advancing gear shift schedules, using less spark retard during gear shift schedules, adjusting torque convertor slip/lock schedules, and adjusting knock and pre-ignition thresholds.

In this way, by computing a road roughness index based on vehicle acceleration in both lateral and longitudinal directions along with individual speed deviation (impact) energy of each wheel, an improved mapping of the road surface may be attained. The technical effect of using a distance filter for road surface roughness estimation over a frequency filter is that the road roughness estimation may be independent of vehicle speed, thereby improving accuracy in higher vehicle speed conditions. Overall, by adjusting engine operating parameters responsive to rough road conditions to improve fuel economy, higher fuel economy and improved emissions benefits may be achieved without any perceptible increase in NVH.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
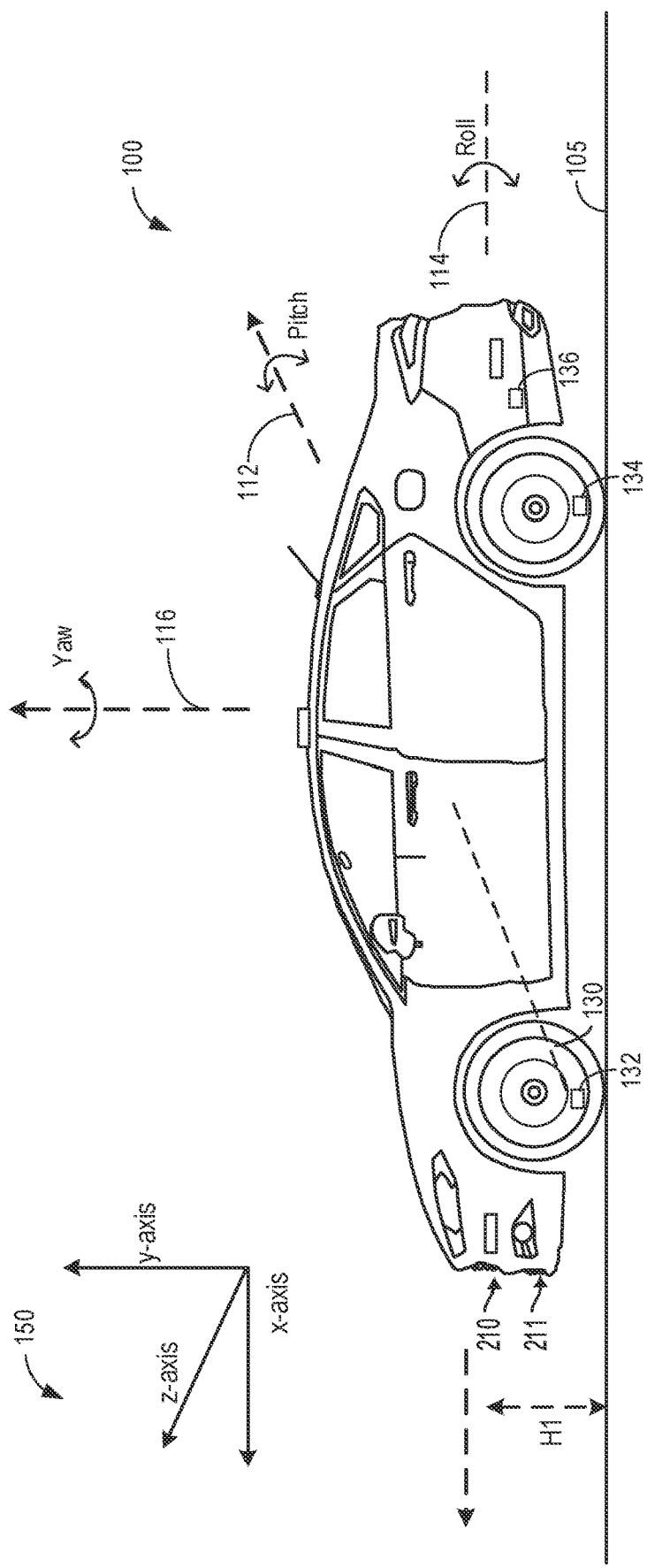
FIG. 1 shows a schematic of an example vehicle system operating on a road surface.
Figure 2:
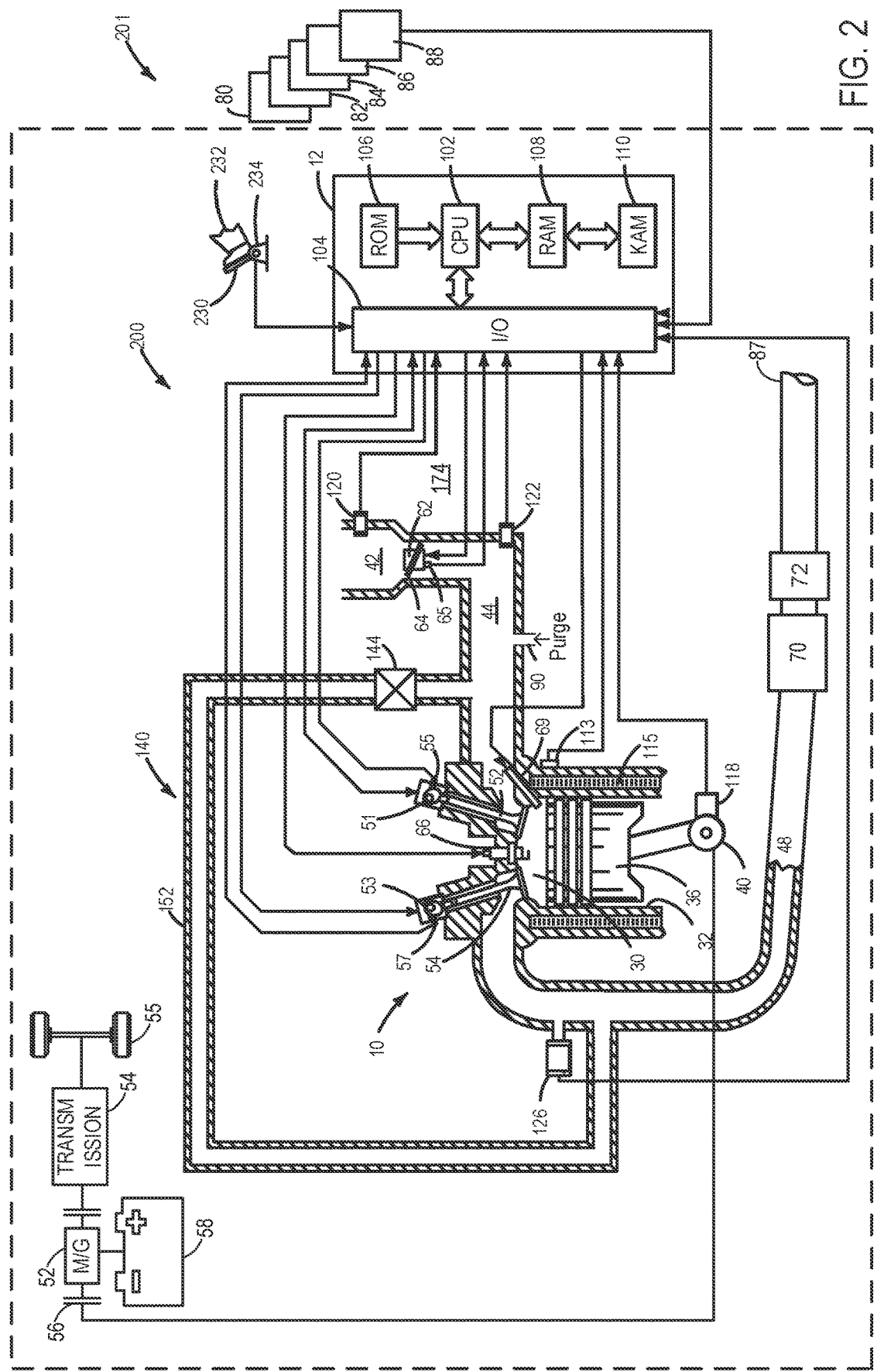
FIG. 2 shows an example vehicle system including an internal combustion engine and sensors for measuring road roughness.

The following description relates to systems and methods for estimation of a road surface metric and adjusting vehicle operation such as exhaust gas recirculation (EGR) and VDE mechanism activation based on the metric. An example vehicle operating on a road is shown in FIG. 1. The vehicle may include an internal combustion engine and a plurality of sensors for measuring road roughness conditions as shown in FIG. 2. An engine controller is configured to perform control routines, such as the example routines of FIG. 3-5, to determine a plurality of parameters for estimation of a road roughness index (RRI). Estimation of the RRI and adjusting one or more engine operating associated with improved fuel economy at elevated NVH during rough road conditions is elaborated in FIG. 6.

Turning now to FIG. 1 illustrating a side view schematics of a vehicle 100. The vehicle may include four wheels 130 and be driven on a surface of a road 105. A distinct speed sensor may be coupled to each vehicle wheel such as wheel speed sensors 132 and 134. A speed of rotation of a respective wheel may be estimated based on output of the wheel speed sensors 132, 134. A vehicle speed sensor 136 may be coupled to the vehicle body. A rate of change of vehicle speed may also be estimated based on output of the speed sensor 136. A coordinate system for the vehicle may be defined with its origin at the center of gravity of the vehicle. A first, longitudinal axis 112 may be a pitch axis of the vehicle and body pitch may be longitudinal rotational motion of the vehicle body about the first axis 112 (such as a dip down of the nose of the vehicle relative to the tail) A second, latitudinal (lateral) axis 114 may be a roll axis of the vehicle and body roll may be an axial rotational motion of the vehicle body about the second axis 114 such as to lean in a direction of perceived centrifugal force acting upon the vehicle. A third, vertical axis 116 may be a yaw axis of the vehicle and body yaw may be a rotational motion of the vehicle body about the third axis 116. When moving forward, the vehicle may travel along the positive x-axis of the Cartesian coordinate 150 on the road 105. Separate acceleration sensors (accelerometers) including a first longitudinal acceleration (about axis 112) sensor, a second latitudinal acceleration (about axis 114) sensor, and a third yaw rate (about axis 116) sensor may be coupled to the vehicle.

The front of the vehicle 100 may include an active grille shutter (AGS) system 210. The AGS 210 may be a dual active grille shutter system comprising two groups of one or more grille shutters configured to adjust the amount of ambient airflow received through grille. In another example, the AGS system 210 may be an active grille shutter system comprising a single group of one or more grille shutters. Vertically below the AGS 210 such as between the AGS 210 and the road, is an air dam 211. The air dam 211 may reduce or nullify the effect of undesired air movement across the vehicle when it is in motion. The air dam 211 may also generate a down-force as the air passes around the vehicle, thereby improving vehicle stability and traction control at higher speeds. Vehicle height H1 can refer to the front vehicle height of the vehicle such as the distance between the surface of the road on which the vehicle is operating and a nose of the vehicle 100.

Vehicle 100 may comprise an active suspension system that enables the control system to regulate vertical positioning of the vehicle wheels 130 relative to the vehicle body. Active suspension system may comprise having hydraulic, electrical, and/or mechanical devices, as well as active suspension systems that control the vehicle height on an individual corner basis (e.g., four corner independently controlled vehicle heights), on an axle-by-axle basis (e.g., front axle and rear axle vehicle heights), or a single vehicle height for the entire vehicle. For example, the active suspension system may include hydraulic or electronic actuators that may raise and lower a vehicle body chassis independently at each wheel. Additionally or alternately, the active suspension system may include shock absorbers coupled at each wheel that can be varied in firmness, depending on vehicle operating conditions. In this way, the control system may raise or lower the front and rear of the vehicle independently in response to vehicle operating conditions.

FIG. 2 is a schematic diagram showing one cylinder of a multi-cylinder engine 10 in an engine system 200. The engine system 200, may be coupled inside a propulsion system of an on road vehicle system 201. In one example vehicle 201 may be vehicle 100 in FIG. 1. The engine 10 may be controlled at least partially by a control system including a controller 12 and by input from a vehicle operator 232 via an input device 230. In this example, the input device 230 includes an accelerator pedal and a pedal position sensor 234 for generating a proportional pedal position signal. A combustion chamber 30 of the engine 10 includes a cylinder formed by cylinder walls 32 with a piston 36 positioned therein. The piston 36 may be coupled to a crankshaft 40 so that reciprocating motion of the piston is translated into rotational motion of the crankshaft. The crankshaft 40 may be coupled to at least one drive wheel of a vehicle via an intermediate transmission system. Further, a starter motor may be coupled to the crankshaft 40 via a flywheel to enable a starting operation of the engine 10.

In one example, engine 10 may be a boosted engine system wherein intake air received in engine cylinders are compressed by an intake compressor (not shown). When included, the intake compressor may be a supercharger compressor driven by a motor or a turbocharger compressor driven by an exhaust turbine. Alternatively, engine 10 may be naturally aspirated.

The combustion chamber 30 may receive intake air from an intake manifold 44 via an intake passage 42 and may exhaust combustion gases via an exhaust passage (e.g., exhaust pipe) 48. The intake manifold 44 and the exhaust pipe 48 can selectively communicate with the combustion chamber 30 via respective intake valve 52 and exhaust valve

54. In some examples, the combustion chamber 30 may include two or more intake valves and/or two or more exhaust valves.

In this example, the intake valve 52 and exhaust valve 54 may be controlled by cam actuation via respective cam actuation systems 51 and 53. The cam actuation systems 51 and 53 may each include one or more cams and may utilize one or more of cam profile switching (CPS), variable cam timing (VCT), variable valve timing (VVT), and/or variable valve lift (VVL) systems that may be operated by the controller 12 to vary valve operation. The position of the intake valve 52 and exhaust valve 54 may be determined by position sensors 55 and 57, respectively. In alternative examples, the intake valve 52 and/or exhaust valve 54 may be controlled by electric valve actuation. For example, the cylinder 30 may alternatively include an intake valve controlled via electric valve actuation and an exhaust valve controlled via cam actuation including CPS and/or VCT systems.

A fuel injector 69 is shown coupled directly to combustion chamber 30 for injecting fuel directly therein in proportion to the pulse width of a signal received from the controller 12. In this manner, the fuel injector 69 provides what is known as direct injection of fuel into the combustion chamber 30. The fuel injector may be mounted in the side of the combustion chamber (as shown) or in the top of the combustion chamber, for example. Fuel may be delivered to the fuel injector 69 by a fuel system (not shown) including a fuel tank, a fuel pump, and a fuel rail. In some examples, the combustion chamber 30 may alternatively or additionally include a fuel injector arranged in the intake manifold 44 in a configuration that provides what is known as port injection of fuel into the intake port upstream of the combustion chamber 30.

Spark is provided to combustion chamber 30 via spark plug 66. The ignition system may further comprise an ignition coil (not shown) for increasing voltage supplied to spark plug 66. In other examples, such as a diesel, spark plug 66 may be omitted.

The intake passage 42 may include a throttle 62 having a throttle plate 64. In this particular example, the position of throttle plate 64 may be varied by the controller 12 via a signal provided to an electric motor or actuator included with the throttle 62, a configuration that is commonly referred to as electronic throttle control (ETC). In this manner, the throttle 62 may be operated to vary the intake air provided to the combustion chamber 30 among other engine cylinders. The position of the throttle plate 64 may be provided to the controller 12 by a throttle position signal. The intake passage 42 may include a mass air flow sensor 120 and a manifold air pressure sensor 122 for sensing an amount of air entering engine 10.

An exhaust gas sensor 126 is shown coupled to the exhaust pipe 48 upstream of both an exhaust gas recirculation system 140 and an emission control device 70 according to a direction of exhaust flow. The sensor 126 may be any suitable sensor for providing an indication of exhaust gas air-fuel ratio such as a linear oxygen sensor or UEGO (universal or wide-range exhaust gas oxygen), a two-state oxygen sensor or EGO, a HEGO (heated EGO), a $NO_x$, HC, or CO sensor. In one example, upstream exhaust gas sensor 126 is UEGO configured to provide output, such as a voltage signal, that is proportional to the amount of oxygen present in the exhaust. Controller 12 converts oxygen sensor output into exhaust gas air-fuel ratio via an oxygen sensor transfer function.

Engine 10 may be a variable displacement engine (VDE) having separate cylinder banks such as a first bank and a second bank with equal or unequal number of engine cylinders. During selected conditions, such as when the full torque capability of the engine is not needed, one of a first or a second cylinder group may be selected for deactivation (herein also referred to as a VDE mode of operation). Specifically, one or more cylinders of the selected group of cylinders may be deactivated by shutting off respective fuel injectors, and deactivating the intake and exhaust valves. While fuel injectors of the disabled cylinders are turned off, the remaining enabled cylinders continue to carry out combustion with fuel injectors active and operating. To meet the torque requirements, the engine produces the same amount of torque on those cylinders for which the injectors remain enabled. This requires higher manifold pressures, resulting in lowered pumping losses and increased engine efficiency. Also, the lower effective surface area (from only the enabled cylinders) exposed to combustion reduces engine heat losses, improving the thermal efficiency of the engine.

Cylinders may be grouped for deactivation in a bank-specific manner. For example, the first group of cylinders may include the four cylinders of the first bank while the second group of cylinders may include the four cylinders of the second bank. In an alternate example, instead of one or more cylinders from each bank being deactivated together, two cylinders from each bank of the engine may be selectively deactivated together. However, during activation of the VDE mechanism such as when one or more cylinders are deactivated or subsequently reactivated, there may be an increase in vehicle NVH which may restrict the use of VDE mechanism in order to maintain operator satisfaction.

An exhaust gas recirculation (EGR) system 140 may route a desired portion of exhaust gas from the exhaust pipe 48 to the intake manifold 44 via an EGR passage 152. EGR reduces pumping work of an engine resulting in increased fuel economy. In addition, EGR effectively cools combustion chamber temperatures thereby reducing NOx formation and improving emissions quality. EGR may also be used to regulate the temperature of the air-fuel mixture within the combustion chamber, thus providing a method of controlling the timing of ignition during some combustion modes. In the depicted example, the EGR delivered is a low-pressure EGR (LP-EGR), wherein a portion of exhaust gas from the exhaust pipe 48 may be delivered from downstream of a turbocharger turbine (not shown) to the engine intake manifold 44, upstream of a turbocharger compressor (not shown). In an alternate example, the EGR delivered may be a high-pressure EGR (HP-EGR), wherein a portion of exhaust gas from the exhaust pipe 48 may be delivered from upstream of a turbocharger turbine (not shown) to the engine intake manifold 44, downstream of a turbocharger compressor (not shown).

In addition to exhaust gases, fuel vapors hydrocarbons may also be delivered to the engine intake manifold 44 for combustion in cylinder 30. For example, fuel vapors stored in a fuel vapor canister (coupled to a fuel tank of the engine's fuel system) may be intermittently purged to the engine intake manifold via purge port 90. The fuel vapors stored in the canister may include refueling vapors, as well as diurnal fuel vapors. Purge flow (including air and canister fuel vapors) along purge port 90 may be controlled via a purge valve (also known as a canister purge valve, not shown). In one example, purge flow may be enabled responsive to a hydrocarbon load of a fuel system canister being higher than a threshold load. In another example, purge flow may be enabled during selected engine operating conditions when air-fuel excursions induced by the ingestion of fuel vapors can be minimized.

The amount of EGR (LP-EGR or HP-EGR) provided to the intake manifold 44 may be determined based on engine operating conditions and further based on NVH constraints. NVH constraints may be based on road roughness conditions. Maximum permissible (target level) EGR flow rate may be determined for a given set of engine operating conditions, such as based on engine speed and load. However, during high EGR flow rates, there may be an increase in vehicle NVH due to poor combustion. Accordingly, an engine control system may operate the engine with sub-optimal levels (lower than the target level) of EGR to improve vehicle drivability and reduce operator dissatisfaction. For example, for a given engine speed-load condition, the actual EGR delivered may be lower than the maximum permissible or target EGR for the given speed-load condition, the actual EGR limited from the target EGR based on an amount of combustion instability generated. As an example, in response to an indication of engine roughness, as indicated by an increase in misfire events, EGR may be lowered from the target EGR.

As a consequence of the EGR being limited, the full fuel economy potential of EGR in an engine may be reduced. However the inventors herein have recognized that during rough road conditions, based on engine operating conditions, EGR flow may be selectively increased to the target level and VDE mechanism may be activated as the NVH resulting from the elevated EGR and VDE mechanism activation may be masked by the NVH resulting from the rough road conditions. Consequently, a vehicle operator may not perceive any further change in NHV due to the increased EGR levels or VDE activation while higher fuel economy is achieved.

In the same manner, the amount of purge flow provided to the intake manifold 44 may be determined based on engine operating conditions and further based on NVH constraints. A maximum permissible (target level) purge flow rate may be determined for a given set of engine operating conditions, such as based on engine speed and load, and further based on canister load. However, during high purge flow rates, there may be an increase in vehicle NVH due to misdistribution of the ingested fuel vapors and poor combustion. Accordingly, an engine control system may operate the engine with sub-optimal levels (lower than the target level) of purge and/or positive crankcase ventilation (PCV) flow to improve vehicle drivability and reduce operator dissatisfaction. For example, for a given engine speed-load condition, the actual purge flow delivered may be lower than the maximum permissible or target purge flow for the given speed-load condition, the actual purge flow limited from the target purge flow based on an amount of combustion instability generated.

As a consequence of the purge flow being limited, the full fuel economy potential of fuel vapor ingestion in an engine may be limited. However the inventors herein have recognized that during higher RRI conditions, purge flow may be selectively increased to (or towards) the target level as the NVH resulting from the elevated fuel vapor flow may be masked by the NVH resulting from the rough road conditions.

Rough road conditions may be detected based on the output of various vehicle sensors coupled external to the engine. As non-limiting examples, sensors used for estimating road roughness may include four wheel speed sensors 80 positioned at the four wheels, a vehicle speed sensor 82 coupled to the vehicle body, and a yaw-rate sensor 84, a longitudinal acceleration (first) sensor 86, and a latitudinal acceleration (second) sensor 88 provided as part of a dynamic suspension system of the vehicle or integrated within the vehicle body near a center of gravity of the vehicle. Still other sensors include a crankshaft acceleration sensor, a suspension sensor, and a wheel slip sensor. Readings from one or more of the above-mentioned sensors may be combined over a distance traveled by the vehicle to determine the RRI of the road on which the vehicle is travelling. Estimation of a rough road index (RRI) and use of the RRI for adjustments of engine parameters is elaborated herein with reference to FIGS. 3-6.

In one example, the RRI may be estimated as a weighted average of a pitch energy, a roll energy, a first absolute wheel speed deviation energy, a second absolute wheel speed deviation energy, a third absolute wheel speed deviation energy, and a fourth absolute wheel speed deviation energy. The pitch energy of the vehicle may be estimated as a function of an acceleration of the vehicle along a longitudinal axis of the vehicle as estimated via a first acceleration sensor 86, and a rate of change of speed of the vehicle as estimated based on an output of a vehicle speed sensor 80, and the roll energy is estimated as a function of an acceleration of the vehicle along a latitudinal axis of the vehicle as estimated via a second acceleration sensor 88, a speed of the vehicle as estimated via the vehicle speed sensor, and a yaw rate of the vehicle as estimated via a yaw rate sensor 84. Each of the pitch energy and the roll energy may be estimated over a first threshold distance, the first threshold distance corresponding to one car length. The first absolute wheel speed deviation energy may be a function of a first wheel speed of the first wheel as estimated via a first wheel speed sensor, the second absolute wheel speed deviation energy may be a function of a second wheel speed of the second wheel as estimated via a second wheel speed sensor, the third absolute wheel speed deviation energy may be a function of a third wheel speed of the third wheel as estimated via a third wheel speed sensor, and the fourth absolute wheel speed deviation energy may be a function of a fourth wheel speed of the fourth wheel as estimated via a fourth wheel speed sensor. The first absolute wheel speed deviation energy may be estimated over a first threshold rotational distance, the second absolute wheel speed deviation energy is estimated over a second threshold rotational distance, the third absolute wheel speed deviation energy is estimated over a third threshold rotational distance, and the fourth absolute wheel speed deviation energy is estimated over a fourth threshold rotational distance. The first threshold rotational distance may be one rotation of the first wheel, the second threshold rotational distance may be one rotation of the second wheel, the third threshold rotation distance may be one rotational of the third wheel, and the fourth threshold rotation distance may be one rotation of the fourth wheel.

In response to the RRI being higher than a threshold, it may be inferred that an increased NVH is generated upon travelling on that road surface and the vehicle may be operated with a fuel economy mode enabled. Operating the vehicle in the fuel economy mode may include adjusting one or more engine operating parameters causing an increase in engine NVH, the one or more engine operating parameters include selectively increasing a flow rate of exhaust gas recirculation (EGR) to an engine intake manifold. The selective increasing may include increasing the flow rate from a first EGR level based on engine speed-load conditions and an engine NVH limit to a second EGR level based on the engine speed-load conditions and independent of the engine NVH limit. Further, in the fuel economy mode, one or more cylinders may be deactivated via actuation of the variable displacement engine (VDE) mechanism.

The emission control device 70 is shown in FIG. 2 arranged along the exhaust pipe 48, downstream of the exhaust gas sensor 126. The device 70 may be a three way catalyst (TWC), $NO_x$ trap, various other emission control devices, or combinations thereof. In some examples, during operation of the engine 10, the emission control device 70 may be periodically reset by operating at least one cylinder of the engine within a particular air-fuel ratio. A particulate filter 72 is shown arranged along the exhaust pipe 48 downstream of the emission control device 70. Exhaust gas treated by emission control device 70 and particulate filter 72 is released into the atmosphere through tailpipe 87. The particulate filter 72 may be a diesel particulate filter or a gasoline particulate filter.

The controller 12 is shown in FIG. 1 as a microcomputer, including a microprocessor unit 102, input/output ports 104, an electronic storage medium for executable programs and calibration values shown as read only memory chip 106 (e.g., non-transitory memory) in this particular example, random access memory 108, keep alive memory 110, and a data bus. The controller 12 may receive various signals from sensors coupled to the engine 10, in addition to those signals previously discussed, measurement of inducted mass air flow (MAF) from the mass air flow sensor 120; engine coolant temperature (ECT) from a temperature sensor 113 coupled to a cooling sleeve 115; an engine position signal from a Hall effect sensor 118 (or other type) sensing a position of crankshaft 40; throttle position from a throttle position sensor 65; and manifold absolute pressure (MAP) signal from the sensor 122. An engine speed signal and crankshaft acceleration may be generated by the controller 12 from crankshaft position sensor 118. Vehicle wheel speed may be estimated based on output from the wheel speed sensor(s) 80. The angular velocity and slip-angle of the vehicle may be measured using the yaw-rate sensor 84. Acceleration sensors 86 and 88 may provide acceleration estimates in longitudinal and latitudinal directions. A vehicle speed sensor may provide estimates of vehicle speed and a rate of change in vehicle posed. Manifold pressure signal also provides an indication of vacuum, or pressure, in the intake manifold 44. Note that various combinations of the above sensors may be used, such as a MAF sensor without a MAP sensor, or vice versa. During engine operation, engine torque may be inferred from the output of MAP sensor 122 and engine speed. Further, this sensor, along with the detected engine speed, may be a basis for estimating charge (including air) inducted into the cylinder. In one example, the crankshaft position sensor 118, which is also used as an engine speed sensor, may produce a predetermined number of equally spaced pulses every revolution of the crankshaft.

The storage medium read-only memory 106 can be programmed with computer readable data representing non-transitory instructions executable by the processor 102 for performing the methods described below as well as other variants that are anticipated but not specifically listed.

The controller 12 receives signals from the various sensors of FIGS. 1-2 and employs the various actuators of FIG. 2 to adjust engine operation based on the received signals and instructions stored on a memory of the controller 12. In one example, during increase in road roughness conditions, the controller 12 may send a signal to an actuator coupled to an EGR valve 144 to increase the opening of the EGR valve 144 in order to increase EGR flow rate.

In this way, the components described in FIGS. 1-2 enable a system for a controller storing instructions in non-transitory memory that, when executed, cause the controller to: estimate a longitudinal acceleration of the vehicle via a longitudinal accelerometer (such as sensor 86), estimate a latitudinal acceleration of the vehicle via a latitudinal accelerometer (such as sensor 88), estimate a yaw rate of the vehicle via a yaw rate sensor (such as sensor 84), estimate a speed of the vehicle and a rate of change of the speed of the vehicle via a vehicle speed sensor (such as sensor 80), estimate a pitch energy of the vehicle over a threshold distance based on the estimated longitudinal acceleration and the rate of change of the speed, estimate a roll energy of the vehicle over the threshold distance based on the estimated latitudinal acceleration, the yaw rate, and the speed, estimate a road roughness index (RRI) based on the estimated pitch energy and roll energy, and in response to the RRI being higher than a threshold, selectively deactivating one or more engine cylinders via a variable displacement engine (VDE) mechanism while maintain combustion in remaining engine cylinders.

Figure 3:
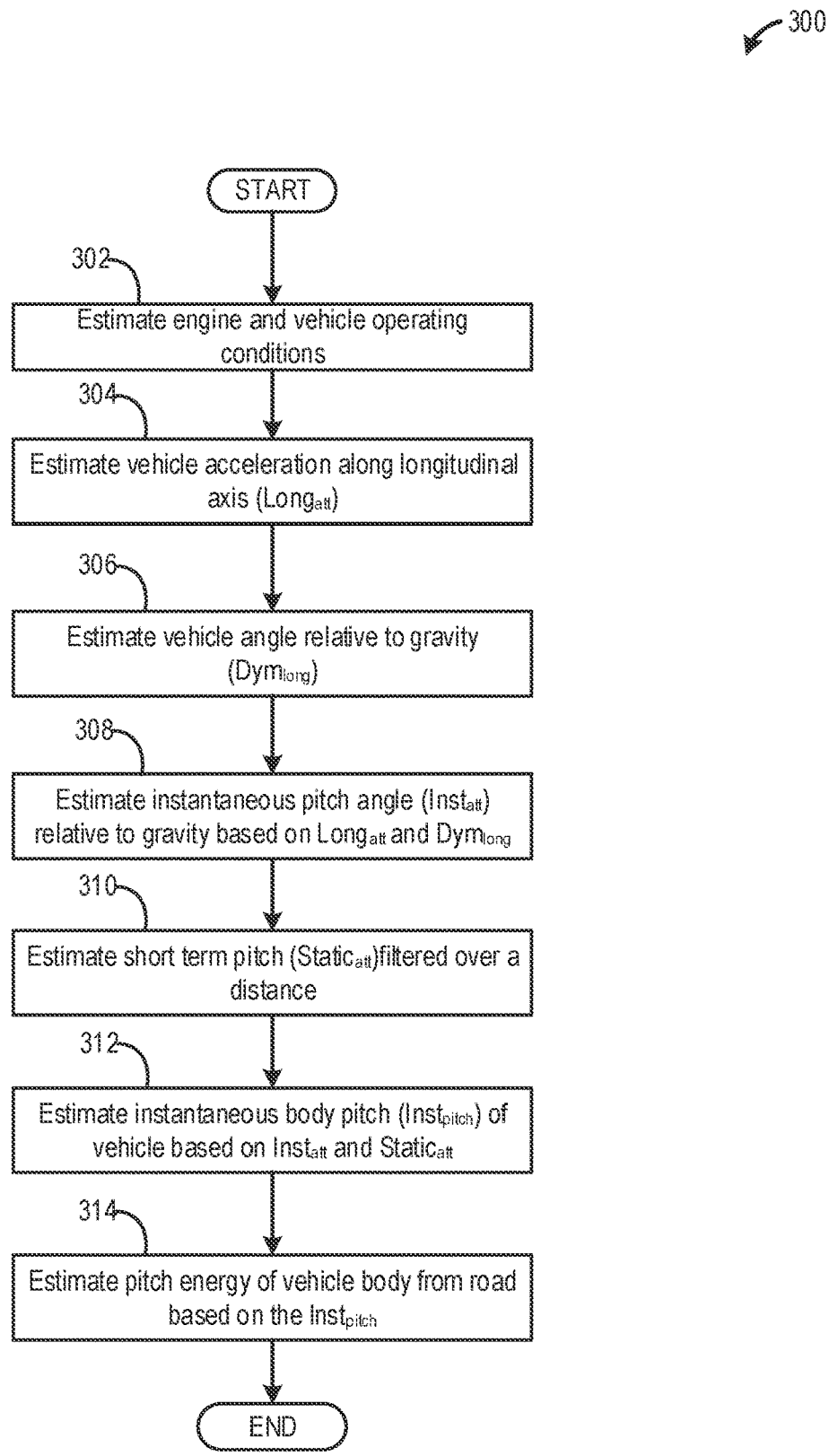
FIG. 3 shows a flow chart illustrating a method that may be implemented for estimating pitch energy of the vehicle relative to the road surface.

FIG. 3 illustrates an example method 300 for estimating pitch energy of the vehicle relative to the road surface, in real-time, based on conditions of a road on which a vehicle is travelling. The pitch energy of the vehicle may provide an estimate of the vehicle's dynamics separate from the road surface. The estimation of the pitch energy may be distance filtered over a threshold distance of travel on the road surface. Instructions for carrying out method 300 may be executed by a controller based on instructions stored on a memory of the controller and in conjunction with signals received from sensors of the engine system and the vehicle system, such as the sensors described above with reference to FIGS. 1 and 2. The controller may employ engine actuators of the engine system to adjust engine operation, according to the methods described below.

At 302, the routine includes estimating and/or measuring current engine and vehicle operating conditions. Conditions assessed may include, for example, engine load, engine speed, vehicle speed, rate of change of vehicle speed, engine temperature, throttle position, exhaust pressure, exhaust air/fuel ratio, ambient conditions (such as ambient temperature, pressure, and humidity), vehicle acceleration along longitudinal and latitudinal directions, yaw rate, etc.

At 304, the acceleration of the vehicle along the longitudinal axis (such as pitch axis 112 in FIG. 1), $Long_{att}$, may be estimated as a function of the output of a longitudinal acceleration sensor (such as longitudinal acceleration sensor 86 in FIG. 2). $Long_{att}$ may be an estimation on the vehicle pitch angle relative to gravity. $Long_{att}$ may be computed using equation 1.

$$\text{Long}_{att} = \sin^{-1}\left(\frac{\text{long}_{acc}}{g}\right)\frac{360}{2\pi} \qquad (1)$$

where $Long_{att}$ is the acceleration of the vehicle along the longitudinal axis, $long_{acc}$ is the output of the longitudinal acceleration sensor, and g is acceleration due to gravity.

At 306, the vehicle pitch angle relative to gravity ($Dym_{long}$), may be estimated as a function of a rate of change in vehicle speed. $Dym_{long}$ may be an indication of the vehicle acceleration due to propulsion (average acceleration rate the vehicle is causing for itself). $Dym_{long}$ may be computed using equation 2.

$$Dym_{long} = \sin^{-1}\left(\frac{vs_{rate}}{g}\right)\frac{360}{2\pi} \qquad (2)$$

where $Dym_{long}$ is the vehicle pitch angle relative to gravity, $vs_{rate}$ is the rate of change in vehicle speed, and g is acceleration due to gravity.

At 308, an instantaneous pitch angle ($Inst_{att}$) of the vehicle body relative to gravity may be estimated based on a difference between $Long_{att}$ and $Dym_{long}$. $Inst_{att}$ may correspond to an instantaneous measurement from the longitudinal acceleration sensor. At 310, a short term pitch ($Static_{att}$) of the vehicle may be estimated based on the $Inst_{att}$. The $Static_{att}$ may be filtered over a threshold distance such as over one car length. $Static_{att}$ may be computed using equation 3.

$$Static_{att} = dist_{filt}(Inst_{att}) \qquad (3)$$

where $Static_{att}$ is the short term pitch of the vehicle, $Inst_{att}$ is the instantaneous pitch angle, and $dist_{filt}$ is a distance filter applied on the instantaneous pitch angle.

At 312, an instantaneous body pitch ($Inst_{pitch}$) of the vehicle may be estimated based on $Inst_{att}$ and $Static_{att}$. The $Inst_{pitch}$ may provide an estimate of how much the front end of the vehicle (such as the nose of the vehicle) is moving along the y-axis (up and down) relative to the road surface. In one example, if the $Inst_{pitch}$ is higher than a threshold, the suspension may adjust the height of the vehicle. Also, if the front of the vehicle moves close to the road surface and is within a threshold distance to the road surface (such as within 6 inches), the air dam may be adjusted (raised and/or lowering disabled) upon the front of the vehicle moving closer to the road surface.

At 314, absolute pitch energy of the vehicle body from the road over the distance may be estimated based on $Inst_{pitch}$. The pitch energy or pitchness of the vehicle may be an indication of variation in vehicle body pitch from average pitch. The pitch energy provides an estimation of an amount of impact provided by the road surface to the body causing the body to move along the y-axis relative to the road surface. The pitch energy may be computed using equation 4.

$$Pitchness = abs(UpLwrEnv(Inst_{pitch})) \qquad (4)$$

where Pitchness is the pitch energy of the vehicle body as the absolute value obtained from using an upper and lower envelope filter (peak and valley detector with decay) on the instantaneous body pitch ($Inst_{pitch}$). One or more additional filters may also be used such as over time.

Figure 4:
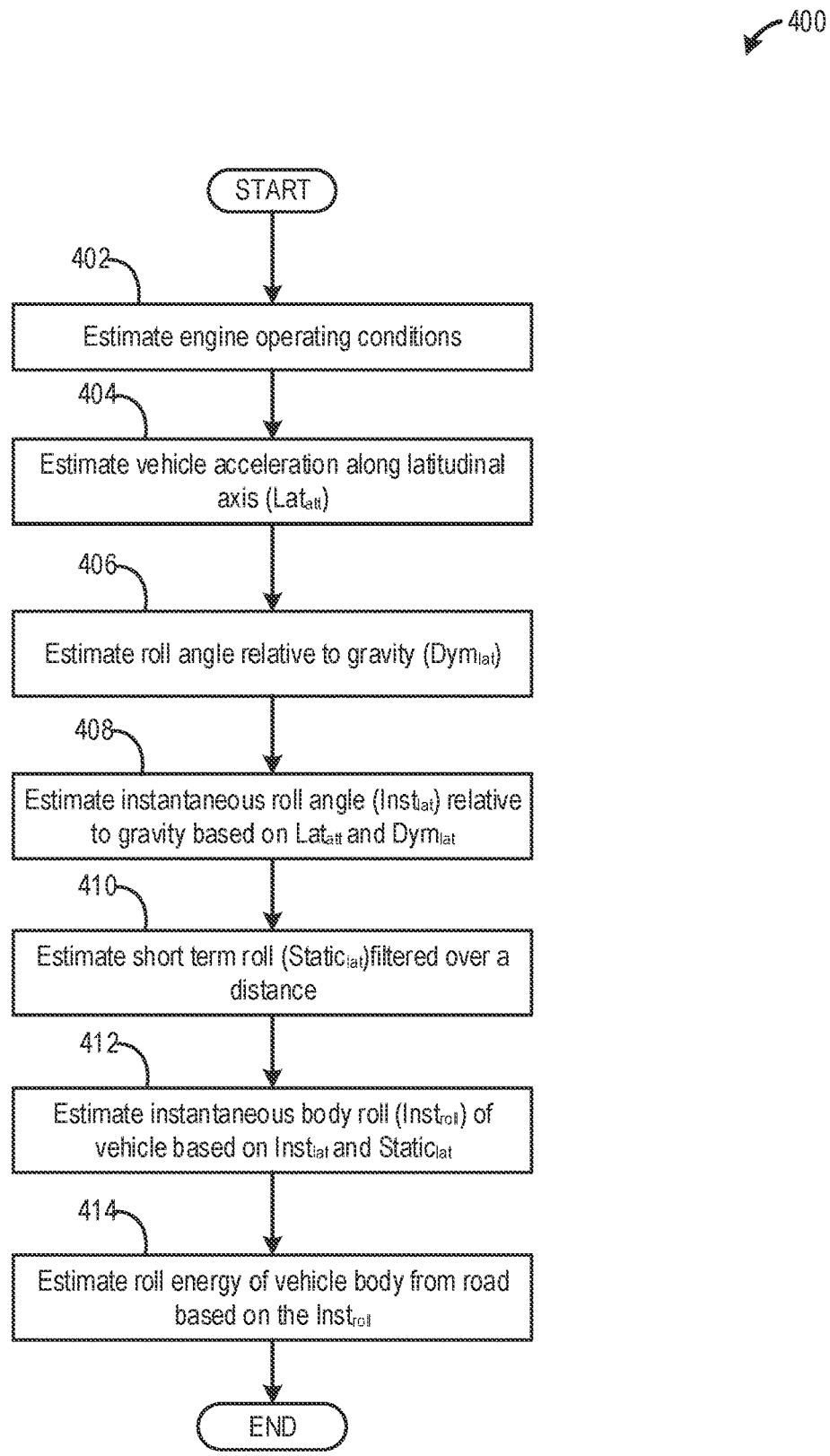
FIG. 4 shows a flow chart illustrating a method that may be implemented for estimating roll energy of the vehicle relative to the road surface.

FIG. 4 illustrates an example method 400 for estimating roll energy of the vehicle relative to the road surface, in real-time based on conditions of a road on which a vehicle is travelling. The estimation of the roll energy may be distance filtered over a threshold distance of travel on the road surface.

At 402, the routine includes estimating and/or measuring current engine and vehicle operating conditions. Conditions assessed may include, for example, engine load, engine speed, vehicle speed, rate of change of vehicle speed, engine temperature, throttle position, exhaust pressure, exhaust air/fuel ratio, ambient conditions (such as ambient temperature, pressure, and humidity), vehicle acceleration along longitudinal and latitudinal directions, yaw rate, etc.

At 404, the acceleration of the vehicle along the latitudinal axis (such as roll axis 114 in FIG. 1), $Lat_{att}$, may be estimated as a function of the output of a latitudinal (lateral) acceleration sensor (such as latitudinal acceleration sensor 88 in FIG. 2). $Lat_{att}$ may be an estimation of the vehicle roll angle relative to gravity. The $Long_{att}$ may be computed using equation 5.

$$Lat_{att} = \sin^{-1}\left(\frac{lat_{acc}}{g}\right)\frac{360}{2\pi} \qquad (5)$$

where $Lat_{att}$ is the acceleration of the vehicle along the latitudinal axis, $lat_{acc}$ is the output of the latitudinal acceleration sensor, and g is acceleration due to gravity.

At 406, the vehicle roll angle relative to gravity ($Dym_{lat}$), may be estimated as a function of vehicle speed, front wheel speed, rear wheel speed, and yaw rate. $Dym_{lat}$ may be an indication of the vehicle lateral acceleration due to dynamic motion such as turn/slip. $Dym_{lat}$ may be computed using equation 6.

$$Dym_{lat} = \sin^{-1}\{(k_1 k_2 vspd(w_r - w_l) + (1 - k_1)k_3 Yawrate)\} \qquad (6)$$

where $Dym_{lat}$ is the vehicle roll angle relative to gravity, vspd is the vehicle speed, $w_r$ is the right wheel speed, $w_l$ is the left wheel speed, Yawrate is the output of the yaw rate sensor, and $k_1$, $k_2$, $k_3$ are constants. $Dym_{lat}$ provides an estimate of how far the left and right side of the vehicle can move up and down relative to the road surface.

At 408, an instantaneous roll angle ($Inst_{lat}$) of the vehicle body relative to gravity may be estimated based on a difference between $Lat_{att}$ and $Dym_{lat}$. $Inst_{lat}$ may correspond to an instantaneous measurement from the latitudinal acceleration sensor. At 410, a short term roll ($Static_{lat}$) of the vehicle may be estimated based on the $Inst_{lat}$. The $Static_{lat}$ may be filtered over a threshold distance such as over one car length. $Static_{lat}$ may be computed using equation 7.

$$Static_{lat} = dist_{filt}(Inst_{lat}) \qquad (7)$$

where $Static_{lat}$ is the short term roll of the vehicle, $Inst_{lat}$ is the instantaneous roll angle, and $dist_{filt}$ is a distance filter applied on the instantaneous roll angle.

At 412, an instantaneous body roll ($Inst_{roll}$) of the vehicle may be estimated based on $Inst_{lat}$ and $Static_{lat}$. The $Inst_{roll}$ may provide an estimate of the lateral motion of the vehicle body relative to the road surface.

At 414, absolute roll energy of the vehicle body from the road over the distance may be estimated based on $Inst_{roll}$. The roll energy or rolliness of the vehicle may be an indication of variation in vehicle body roll from average roll. The roll energy provides an estimation of an amount of impact provided by the road surface to the body causing the body to move laterally relative to the road surface. The roll energy may be computed using equation 8.

$$Rolliness = abs(UpLwrEnv(Inst_{roll})) \qquad (8)$$

where Rolliness is the roll energy of the vehicle body as the absolute value obtained from using an upper and lower envelope filter (peak and valley detector with decay) on the instantaneous body roll. One or more additional filters may also be used such as over time.

Figure 5:
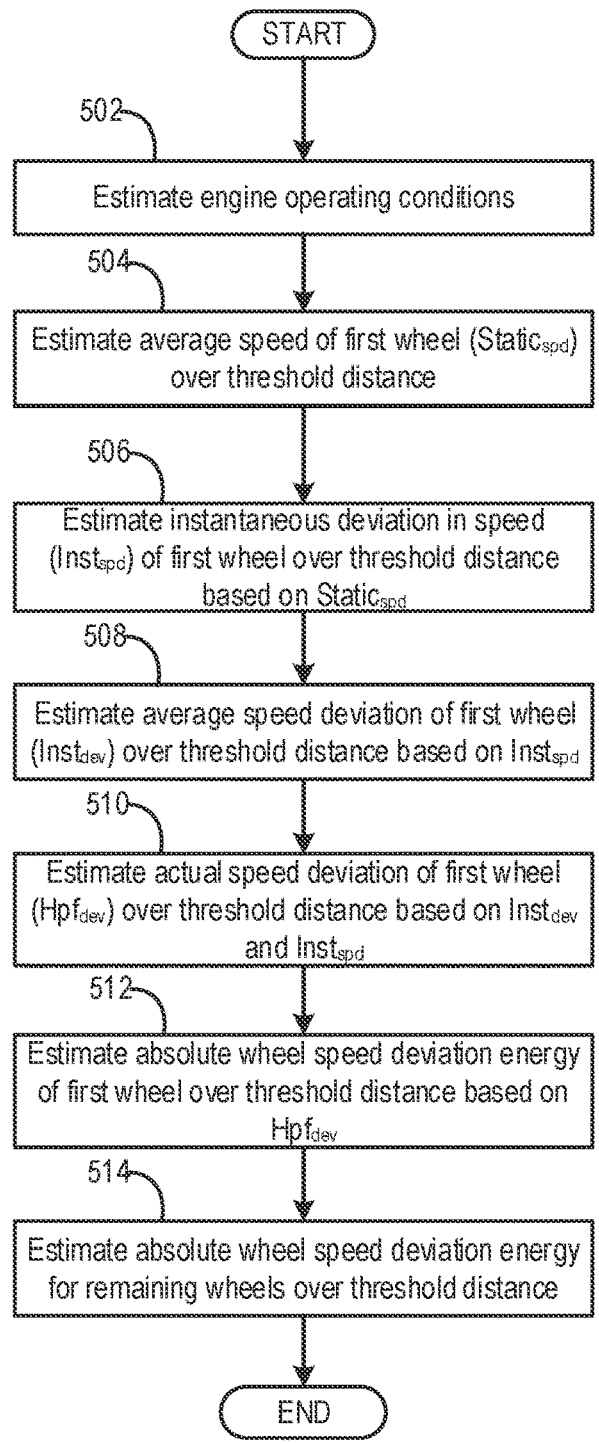
FIG. 5 shows a flow chart illustrating a method that may be implemented for estimating wheel speed deviation energy for each wheel of the vehicle.

FIG. 5 illustrates an example method 500 for estimating wheel speed deviation energy for each wheel of the vehicle, in real-time based on conditions of a road on which the vehicle is travelling. At 502, the routine includes estimating and/or measuring current engine and vehicle operating conditions. Conditions assessed may include, for example, engine load, engine speed, vehicle speed, rate of change of vehicle speed, engine temperature, throttle position, exhaust pressure, exhaust air/fuel ratio, ambient conditions (such as ambient temperature, pressure, and humidity), vehicle acceleration along longitudinal and latitudinal directions, yaw rate, wheel speeds, etc.

At 504, an average speed (Static$_{spd}$) of a first wheel may be estimated over a threshold distance as a function of speed of the first wheel as estimated via a speed sensor coupled to the first wheel. In one example, the distance may be one rotation of the wheel. Static$_{spd}$ may be an estimation of how much the wheel is speeding up or slowing down on average over the threshold distance. Static$_{spd}$ may be computed using equation 9.

$$\text{Static}_{spd} = \text{dist}_{filt}(\text{wheel}_{spd}) \quad (9)$$

where Static$_{spd}$ is the average speed of the first wheel, wheel$_{spd}$ is the output of the speed sensor on the first wheel, and dist$_{filt}$ is a distance filter.

At 506, an instantaneous deviation in speed (Inst$_{spd}$) of the first wheel may be estimated over the threshold distance based on a difference between the speed of the first wheel (wheel$_{spd}$) and the average speed of the first wheel Static$_{spd}$. Inst$_{spd}$ may provide an estimation of the first wheel gaining or losing any speed over the threshold (rotational) distance.

At 508, an average deviation in speed (Inst$_{dev}$) of the first wheel may be estimated based on the instantaneous deviation in speed, Inst$_{spd}$. Inst$_{dev}$ may be computed using equation 10.

$$\text{Inst}_{dev} = \text{UpLwrEnv}(\text{Inst}_{spd}) \quad (10)$$

where Inst$_{dev}$ is the average deviation in speed of the first wheel and UpLwrEnv is an upper and lower envelope filter applied on the instantaneous deviation in speed, Inst$_{spd}$.

At 510, an actual deviation in speed of the first wheel (Hpf$_{dev}$) may be estimated over the threshold distance based on a difference between the instantaneous deviation in speed (Inst$_{spd}$) of the first wheel and the average deviation in speed (Inst$_{dev}$) of the first wheel over the threshold distance. The Hpf$_{dev}$ may provide an estimate of an actual rebound on the tire as the wheel travels on the road surface.

At 512, an absolute wheel speed deviation energy (up$_{spd}$) of the first wheel may be estimated based on the actual deviation in speed of the first wheel (Hpf$_{dev}$). The up$_{spd}$ may correspond to an energy content of the first wheel as it moves along the road surface and may be proportional to the impact energy on the tire of the first wheel. The absolute wheel speed deviation energy may be computed using equation 11.

$$\text{up}_{spd} = \text{abs}(\text{UpLwrEnv}(\text{distance}, \text{Inst}_{dev})) \quad (11)$$

where up$_{spd}$ is the energy of the first wheel as the absolute value obtained from using an upper and lower envelope filter (peak and valley detector with decay) on the instantaneous deviation in speed of the first wheel over the threshold distance. One or more additional filters may also be used such as over time.

At 514, the respective absolute wheel speed deviation energy for each of the vehicle wheels may be estimated over the threshold duration following the steps discussed in 504-512. In a vehicle with four wheels, the absolute wheel speed deviation energy may be estimated for each of the four wheels separately based on respective outputs of the wheel speed sensors.

Figure 6:
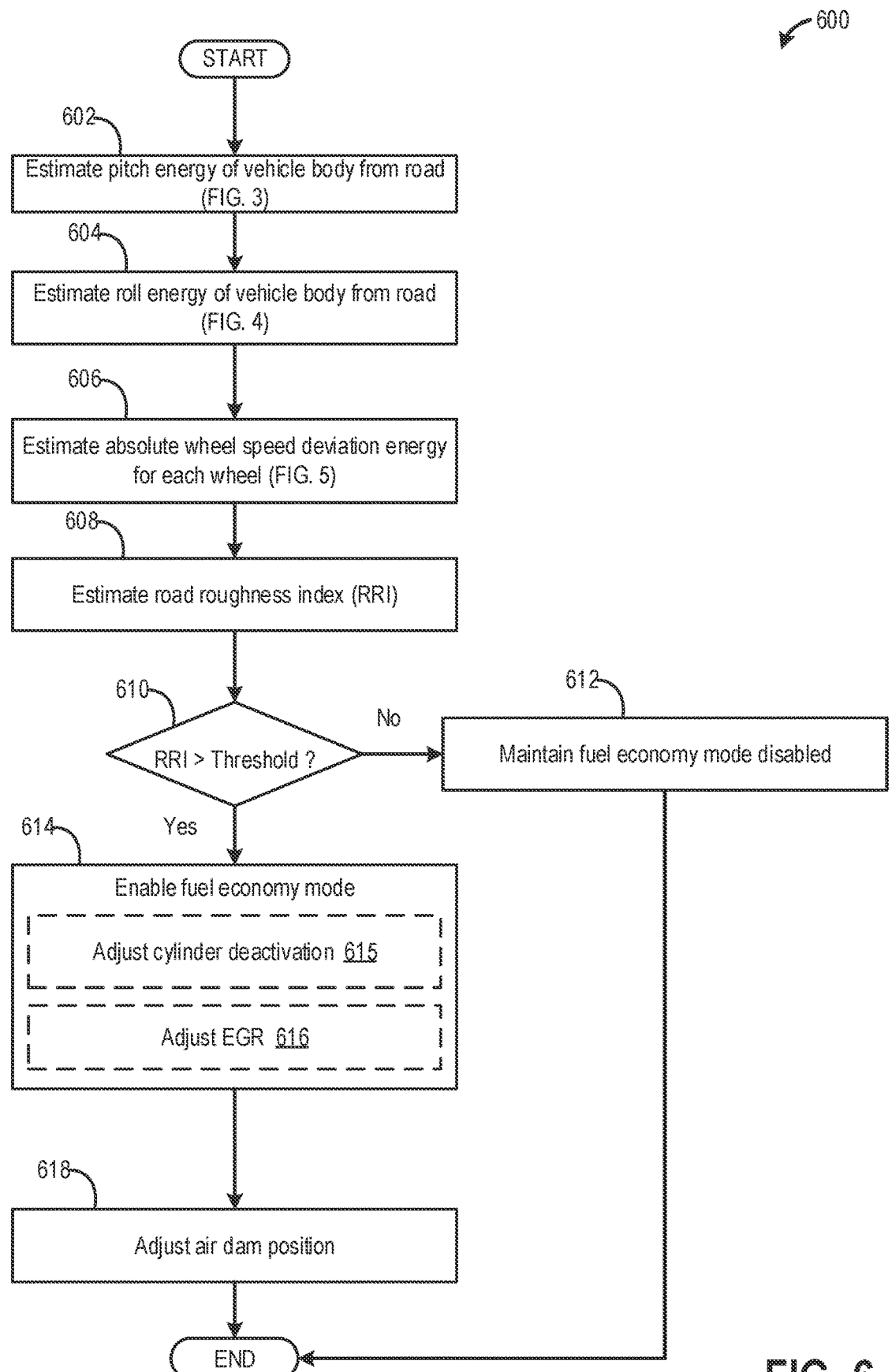
FIG. 6 shows a flow chart illustrating a method that may be implemented for estimating a road surface roughness index and adjusting engine operation based on the estimated roughness.

FIG. 6 illustrates an example method 600 for estimating a road roughness index (RRI) and adjusting engine operation based on the estimated roughness. The road roughness index may provide an estimation of roughness on the road that may cause NVH in the vehicle while being driven on the road.

At 602, a pitch energy (Pitchness) of the vehicle body relative to the road surface may be estimated based on the method elaborated in FIG. 3. The pitch energy may provide an estimate of an absolute pitch variation in the vehicle per unit distance travelled along the road surface. At 604, a roll energy (Rolliness) of the vehicle body relative to the roads surface may be estimated based on the method elaborated in FIG. 4. Similar to the pitch energy, the roll energy may provide an estimate of an absolute roll variation in the vehicle per unit distance travelled along the road surface. At 606, absolute wheel speed deviation energy for each wheel (up$_{spd}$1, up$_{spd}$2, up$_{spd}$3, up$_{spd}$4) may be estimated based on the method elaborated in FIG. 5. Each of the four wheel speed deviation energy values provide estimate of absolute wheel angle variation per distance for that wheel travelled along the roadway.

At 608, the road roughness index (RRI) may be estimated based on each of the estimated pitch energy, the roll energy, and the four absolute wheel speed deviation energies. In one example, the RRI may be estimated as weighted average of each of the pitch energy, the roll energy, and the four absolute wheel speed deviation energies. In another example, a non-linear map of RRI may be obtained by statistical combination (such as average/maxima/minima/median) of the pitch energy, the roll energy, and the four absolute wheel speed deviation energies. A road with a lower RRI may have a smoother surface and vehicle operation on the smoother surface may cause a lower level of NVH relative to travel on a road with a higher RRI.

At 610, the routine includes determining if the RRI of the road surface is higher than a pre-calibrated threshold RRI. The threshold RRI may correspond to a level of road roughness at which sufficient NVH may be generated while driving on the road to mask undesirable sounds in the engine. When the RRI is higher than the threshold, there may be an opportunity to increase the level of one or more engine operating parameters, such as the EGR level and the purge frequency or actuate a VDE mechanism, since the increased NVH due to the road roughness may mask any NVH resulting from the change in the operating parameter (such as the EGR or VDE engagement).

If it is determined that the RRI is lower than the threshold RRI, at 612, the fuel economy mode is disabled. The fuel economy mode may include activation or increase of engine operating parameters such as activation of VDE and increase in EGR flow rate which may improve fuel economy but may increase engine NVH. For example, the EGR flow rate may be maintained at a lower level and/or the VDE mechanism may be maintained disabled such that the increased NVH is not perceived by the operator.

If it is determined that the RRI index is higher than the threshold RRI, it may be inferred that the NVH generated by the vehicle travel on the road may be sufficient to mask any further NVH caused by change in engine operation. Therefore, at 614, a fuel economy mode may be enabled regardless of the increased NHV concerns from the change in engine operation.

The fuel economy mode may include, at 615, adjusting cylinder deactivation using the VDE mechanism. In one example, cylinder deactivation may be enabled when torque demand is less than a pre-calibrated threshold. Upon confirmation of a VDE mode of operation, a group of cylinders and/or an engine bank to be deactivated may be selected based on the estimated engine operating conditions. The selection may be based on, for example, which group of cylinders was deactivated during a previous VDE mode of operation. For example, if during the previous cylinder deactivation condition, a first group of cylinders on a first engine bank were deactivated, then a controller may select a second group of cylinders on a second engine bank for deactivation during the present VDE mode of operation. As another example, the selection may be based on a regeneration state of a first exhaust catalyst (or emission control device) coupled to the first bank relative to the regeneration state of a second exhaust catalyst (or emission control device) coupled to the second bank. Following the selection, the controller may selectively deactivate one or more engine cylinders. As used herein, the deactivation may include selectively deactivating (e.g., turning off) a fuel injector of the selected one or more engine cylinders. While deactivating fuel injection to the selected group of cylinders, the controller may continue to operate (e.g., open or close) intake and exhaust valves of the deactivated cylinders so as to flow air and/or exhaust gases through the deactivated cylinders. In one example, where the engine is a V8 engine, during a VDE mode, the engine may be operated with one group of cylinders activated (that is, in a V4 mode) while during the non-VDE mode, the engine may be operated with both groups of cylinders activated (that is, in a V8 mode). By operating the engine with lower number of combusting cylinders during lower torque demand conditions, fuel economy may be improved.

The fuel economy mode may further include, at 616, adjusting EGR flow rate. Increasing the EGR flow rate may include increasing an opening of the EGR valve coupled in a low pressure EGR passage. A target EGR flow rate may be estimated based on engine operating conditions such as engine speed, engine load, and engine temperature. For example, the controller may send a signal to an actuator coupled to the EGR valve to increase the opening of the EGR valve to enable EGR flow at the target EGR level. By increasing the EGR flow rate to the target level, engine fuel economy is improved. At the same time, any increase in engine roughness due to a drop in combustion quality at the higher EGR level may be masked by the NVH associated with rough road conditions and therefore may not be perceptible to the vehicle operator.

The fuel economy mode may further include opportunistically updating one or more other additional engine operating parameters to improve fuel economy and engine performance. The parameters may include (but are not limited to) use of spark retard during a transmission gear shift schedule, torque convertor slip schedule, purge frequency, altering exhaust cam phasing in a variable cam timing (VCT) engine, and initialization of on-board diagnostic routines. Any increase in NVH experienced due to a change in one or more of the above-mentioned parameters would be masked by the increased NVH levels associated with the rough road conditions.

For example, a purge frequency may be increased allowing for more purge flow vapors to be ingested in the engine during rough road conditions. As another example, a transmission gear shift may be scheduled earlier during the rough road condition so that they can be completed during the rough road condition. In addition, they may be scheduled with the use of less spark retard. As yet another example, on-board diagnostic monitors that may be intrusive and cause potential NVH concerns may be initialized during rough road conditions without causing any noticeable deterioration in NVH levels. As yet another example, if a torque converter slip was scheduled to eliminate NVH, less slip (or more lock-up) may be scheduled to reduce fuel loss. For example, a lock-up clutch of the torque converter may be configured to slip less during the gear shift. As still another example, an engine knock threshold may be raised to a level that allows for the use of more spark advance. Likewise, an engine pre-ignition threshold may be raised to allow for improved pre-ignition detection in the presence of rough road conditions. As with the increase in EGR, the adjustment of each of the other operating parameters may be increased until engine misfires are indicated, and then the increase may be capped or limited. For example, EGR may be reduced under the misfire limit.

The inventors have recognized that the increasing regulation for fuel economy and emissions have led to many new technologies being developed for spark ignition gasoline engines. For example, transmissions can either slip the lock up clutch, or lock and unlock the torque convertor during gear shifting to make shifts feel smooth. Additionally, to make shifts smooth, large spark retard may be used to match torque levels before and after a gear change. Both slipping and opening of the torque convertor clutch, and large spark retard from MBT result in decreased fuel economy. Another example may be the engine lug limit. At low engine speed and moderate load the vehicle may vibrate, and lug resulting in poor NVH characteristics. Typically this is mitigated by slipping or opening the torque convertor clutch allowing the engine speed to be raised relative to wheel speed avoiding the lugging area. However, during rough road conditions, a torque convertor slip or lock up schedule can be modified, as well as the spark retard used for torque control can be adjusted. Since it will be difficult for the operator to discern the rough road NVH from the powertrain NVH, the powertrain could be operated more efficiently. For example when on a rough road, during a shifting event, the torque converter may be left locked, or slipped less (e.g., 10% on a rougher road vs 20% on a smoother road), the slippage depending on the roughness of the road. Also during the shift events, spark may be retarded less for torque matching (e.g., 25 deg. retarded from MBT on a rougher road vs 35 deg. retarded from MBT on a smoother road). Similar slip percentage changes could also be done during the lugging period. All these modifications result in improved fuel economy, which may provide customers more real world fuel economy improvement where roads are unimproved, or benefit customers in countries where road conditions are poor, and improved fuel economy is appreciated.

It will be appreciated that as with EGR, the one or more other engine operating parameters may be adjusted (e.g., increased) until a misfire count becomes higher than a threshold. Thereafter, the parameter may be reduced. Specifically, if misfires are detected while providing the elevated purge level, the increase in purge flow may be limited or reduced to the misfire limit level of purge. The limit may be a mapped limit, including a safety margin for misfire/poor combustion in the presence of noise factors (such as humidity, and part to part variation). In this way it is possible to change engine operating parameter during rough road conditions, thereby improving engine performance.

In this way, during a first condition, in response to an estimated road roughness index (RRI) being lower than a threshold level, an amount of EGR delivered to an engine may be maintained at a lower than a target amount of EGR, and during a second condition, in response to the estimated RRI being higher than the threshold level, the amount of EGR delivered to the engine may be increased to the target amount of EGR, the RRI estimated based on an each of an estimated pitch energy of the vehicle and an estimated roll energy of the vehicle.

AT 618, a position of the air dam may be adjusted based on the RRI. In one example, during a higher than threshold RRI, the air dam may be raised to avoid contact of the air dam with the road surface.

In this way, by estimating a RRI as a function of each of an estimated vehicle pitch energy, vehicle roll energy, and absolute wheel speed deviation energy from each vehicle wheel, an accurate estimation of road roughness may be attained for improved vehicle operation adjustments. The technical effect of adjusting engine operation such as EGR supply and cylinder deactivation based on the RRI is that the NVH caused by the change in engine operations may be masked by the vehicle's VNH caused by travelling on a rough road, thereby making the engine adjustments not perceivable by the operator. Overall, by opportunistically adjusting the mentioned engine operations, fuel efficiency and emissions quality.

An example method for a vehicle comprises: estimating a road roughness index (RRI) of a road based on one or more of a pitch energy and a roll energy of the vehicle travelling on the road, and in response to a higher than threshold road roughness, enabling a fuel economy mode of the vehicle. In the preceding example, additionally or optionally, the pitch energy is estimated as a function of an acceleration of the vehicle along a longitudinal axis of the vehicle as estimated via a first acceleration sensor, and a rate of change of a speed of the vehicle as estimated based on an output of a vehicle speed sensor. In any or all of the preceding examples, additionally or optionally, the roll energy is estimated as a function of an acceleration of the vehicle along a latitudinal axis of the vehicle as estimated via a second acceleration sensor, the speed of the vehicle as estimated via the vehicle speed sensor, and a yaw rate of the vehicle as estimated via a yaw rate sensor. In any or all of the preceding examples, additionally or optionally, each of the pitch energy and the roll energy is estimated over a first threshold distance, the first threshold distance corresponding to one car length. In any or all of the preceding examples, additionally or optionally, the RRI is further estimated based on each of a first absolute wheel speed deviation energy of a first wheel, a second absolute wheel speed deviation energy of a second wheel, a third absolute wheel speed deviation energy of a third wheel, and a fourth absolute wheel speed deviation energy of a fourth wheel. In any or all of the preceding examples, additionally or optionally, the first absolute wheel speed deviation energy is a function of a first wheel speed of the first wheel as estimated via a first wheel speed sensor, wherein the second absolute wheel speed deviation energy is a function of a second wheel speed of the second wheel as estimated via a second wheel speed sensor, wherein the third absolute wheel speed deviation energy is a function of a third wheel speed of the third wheel as estimated via a third wheel speed sensor, and wherein the fourth absolute wheel speed deviation energy is a function of a fourth wheel speed of the fourth wheel as estimated via a fourth wheel speed sensor. In any or all of the preceding examples, additionally or optionally, the first absolute wheel speed deviation energy is estimated over a first threshold rotational distance, the second absolute wheel speed deviation energy is estimated over a second threshold rotational distance, the third absolute wheel speed deviation energy is estimated over a third threshold rotational distance, and the fourth absolute wheel speed deviation energy is estimated over a fourth threshold rotational distance. In any or all of the preceding examples, additionally or optionally, the first threshold rotational distance is one rotation of the first wheel, the second threshold rotational distance is one rotation of the second wheel, the third threshold rotation distance is one rotational of the third wheel, and the fourth threshold rotation distance is one rotation of the fourth wheel. In any or all of the preceding examples, additionally or optionally, the RRI is estimated as a weighted average of the pitch energy, the roll energy, the first absolute wheel speed deviation energy, the second absolute wheel speed deviation energy, the third absolute wheel speed deviation energy, and the fourth absolute wheel speed deviation energy. In any or all of the preceding examples, additionally or optionally, operating the vehicle in the fuel economy mode includes adjusting one or more engine operating parameters causing an increase in engine noise, vibration, and hoarseness (NVH), the one or more engine operating parameters include selectively increasing a flow rate of exhaust gas recitation (EGR) to an engine intake manifold. In any or all of the preceding examples, additionally or optionally, the selectively increasing includes increasing the flow rate increased from a first EGR level based on engine speed-load conditions and an engine NVH limit to a second EGR level based on the engine speed-load conditions and independent of the engine NVH limit. In any or all of the preceding examples, additionally or optionally, the one or more engine operating parameters include deactivating one or more cylinders via actuation of a variable displacement engine (VDE) mechanism.

Another example method for an engine coupled to an on-road vehicle, comprises: during a first condition, in response to an estimated road roughness index (RRI) being lower than a threshold level, maintaining an amount of EGR delivered to the engine lower than a target amount of the EGR; and during a second condition, in response to the estimated RRI being higher than the threshold level, increasing the amount of the EGR delivered to the engine to the target amount of the EGR, the RRI estimated based on an each of an estimated pitch energy of the vehicle and an estimated roll energy of the vehicle. In the preceding example, additionally or optionally, the pitch energy of the vehicle is estimated as a function of a longitudinal acceleration of the vehicle and a rate of change of vehicle speed, and wherein the roll energy is estimated as a function of a lateral acceleration of the vehicle, a speed of the vehicle, and a yaw rate of the vehicle. In any or all of the preceding examples, additionally or optionally, each of the pitch energy and the roll energy is filtered over a threshold distance. In any or all of the preceding examples, additionally or optionally, the RRI is estimated based on a weighted average of each of the roll energy, the pitch energy, a first absolute wheel speed deviation energy of a first wheel, a second absolute wheel speed deviation energy of a second wheel, a third absolute wheel speed deviation energy of a third wheel, and a fourth absolute wheel speed deviation energy of a fourth wheel. In any or all of the preceding examples, additionally or optionally, the first absolute wheel speed deviation energy is a function of a speed of the first wheel over a threshold rotational distance, wherein the second absolute wheel speed deviation energy is a function of a speed of the second wheel over the threshold rotational distance, wherein the third absolute wheel speed deviation energy is a function of a speed of the third wheel over the threshold rotational distance, and wherein the fourth absolute wheel speed deviation energy is a function of a speed of the fourth wheel over the threshold rotational distance.

Another example for a vehicle, comprises: a controller storing instructions in non-transitory memory that, when executed, cause the controller to: estimate a longitudinal acceleration of the vehicle via a longitudinal accelerometer, estimate a latitudinal acceleration of the vehicle via a latitudinal accelerometer, estimate a yaw rate of the vehicle via a yaw rate sensor, estimate a speed of the vehicle and a rate of change of the speed of the vehicle via a vehicle speed sensor, estimate a pitch energy of the vehicle over a threshold distance based on the estimated longitudinal acceleration and the rate of change of the speed, estimate a roll energy of the vehicle over the threshold distance based on the estimated latitudinal acceleration, the yaw rate, and the speed, estimate a road roughness index (RRI) based on the estimated pitch energy and roll energy, and in response to the RRI being higher than a threshold, selectively deactivating one or more engine cylinders via a variable displacement engine (VDE) mechanism while maintain combustion in remaining engine cylinders. In any of the preceding examples, additionally or optionally, the controller includes further instructions to: estimate a first speed of a first wheel via a first wheel speed sensor, estimate a second speed of a second wheel via a second wheel speed sensor, estimate a third speed of a third wheel via a third wheel speed sensor, estimate a fourth speed of a fourth wheel via a fourth wheel speed sensor, and estimate a first absolute wheel speed deviation energy, a second absolute wheel speed deviation energy, a third absolute wheel speed deviation energy, and a fourth absolute wheel speed deviation energy based on the first speed, the second speed, the third speed, and the fourth speed, respectively. In any or all of the preceding examples, additionally or optionally, the RRI is estimated as a weighted average of each of the pitch energy, the roll energy, the first absolute wheel speed deviation energy, the second absolute wheel speed deviation energy, the third absolute wheel speed deviation energy, and the fourth absolute wheel speed deviation energy.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle, comprising:
    estimating a road roughness index (RRI) of a road based on one or more of a pitch energy and a roll energy of the vehicle travelling on the road, wherein the RRI is further based on each of a first absolute wheel speed deviation energy of a first wheel, a second absolute wheel speed deviation energy of a second wheel, a third absolute wheel speed deviation energy of a third wheel, and a fourth absolute wheel speed deviation energy of a fourth wheel, and, in response to a higher than a threshold RRI, enabling a fuel economy mode of the vehicle; and
    in response to a lower than the threshold RRI, maintaining a disabled fuel economy mode.

2. The method of claim 1, wherein the pitch energy is a function of an acceleration of the vehicle along a longitudinal axis of the vehicle as estimated via a first acceleration sensor, and a rate of change of a speed of the vehicle as estimated based on an output of a vehicle speed sensor.

3. The method of claim 2, wherein the roll energy is a function of an acceleration of the vehicle along a latitudinal axis of the vehicle as estimated via a second acceleration sensor, the speed of the vehicle as estimated via the vehicle speed sensor, and a yaw rate of the vehicle as estimated via a yaw rate sensor.

4. The method of claim 1, wherein each of the pitch energy and the roll energy is based on estimates over a first threshold distance, the first threshold distance corresponding to one car length.

5. The method of claim 1, wherein the first absolute wheel speed deviation energy is a function of a first wheel speed of the first wheel as estimated via a first wheel speed sensor, wherein the second absolute wheel speed deviation energy is a function of a second wheel speed of the second wheel as estimated via a second wheel speed sensor, wherein the third absolute wheel speed deviation energy is a function of a third wheel speed of the third wheel as estimated via a third wheel speed sensor, and wherein the fourth absolute wheel speed deviation energy is a function of a fourth wheel speed of the fourth wheel as estimated via a fourth wheel speed sensor.

6. The method of claim 5, wherein the first absolute wheel speed deviation energy is estimated over a first threshold rotational distance, the second absolute wheel speed deviation energy is estimated over a second threshold rotational distance, the third absolute wheel speed deviation energy is estimated over a third threshold rotational distance, and the fourth absolute wheel speed deviation energy is estimated over a fourth threshold rotational distance.

7. The method of claim 6, wherein the first threshold rotational distance is one rotation of the first wheel, the second threshold rotational distance is one rotation of the second wheel, the third threshold rotational distance is one rotation of the third wheel, and the fourth threshold rotational distance is one rotation of the fourth wheel.

8. The method of claim 1, wherein the RRI is estimated as a weighted average of the pitch energy, the roll energy, the first absolute wheel speed deviation energy, the second absolute wheel speed deviation energy, the third absolute wheel speed deviation energy, and the fourth absolute wheel speed deviation energy.

9. The method of claim 1, wherein enabling the fuel economy mode of the vehicle includes adjusting engine operating parameters causing an increase in engine noise, vibration, and harshness (NVH), and wherein adjusting the engine operating parameters includes increasing a flow rate of exhaust gas recirculation (EGR) to an engine intake manifold.

10. The method of claim 9, wherein increasing the flow rate of EGR includes increasing the flow rate from a first EGR level based on engine speed-load conditions and an engine NVH limit to a second EGR level based on the engine speed-load conditions and independent of the engine NVH limit.

11. The method of claim 9, wherein adjusting the engine operating parameters further includes deactivating one or more cylinders via actuation of a variable displacement engine (VDE) mechanism.

12. A method for an engine coupled to an on-road vehicle, comprising:
estimating a road roughness index (RRI), wherein estimating the RRI includes estimating a pitch energy over a threshold distance based on an estimated longitudinal acceleration and a rate of change of a speed of the vehicle, and estimating a roll energy over a threshold distance based on an estimated latitudinal acceleration, a yaw rate, and the speed of the vehicle;
in response to the estimated RRI being lower than a threshold level, maintaining an amount of exhaust gas recirculation (EGR) delivered to the engine lower than a target amount of the EGR; and
in response to the estimated RRI being higher than the threshold level, increasing the amount of the EGR delivered to the engine to the target amount of the EGR.

13. The method of claim 12, wherein estimating each of the pitch energy and the roll energy includes filtering each of the pitch energy and the roll energy over a threshold distance.

14. The method of claim 12, wherein estimating the RRI further includes taking a weighted average of each of the roll energy, the pitch energy, a first absolute wheel speed deviation energy of a first wheel, a second absolute wheel speed deviation energy of a second wheel, a third absolute wheel speed deviation energy of a third wheel, and a fourth absolute wheel speed deviation energy of a fourth wheel.

15. The method of claim 14, wherein the first absolute wheel speed deviation energy is a function of a speed of the first wheel over a threshold rotational distance, wherein the second absolute wheel speed deviation energy is a function of a speed of the second wheel over the threshold rotational distance, wherein the third absolute wheel speed deviation energy is a function of a speed of the third wheel over the threshold rotational distance, and wherein the fourth absolute wheel speed deviation energy is a function of a speed of the fourth wheel over the threshold rotational distance.

16. A system for a vehicle, comprising:
a controller storing instructions in non-transitory memory that, when executed, cause the controller to:
estimate a longitudinal acceleration of the vehicle via a longitudinal accelerometer;
estimate a latitudinal acceleration of the vehicle via a latitudinal accelerometer;
estimate a yaw rate of the vehicle via a yaw rate sensor;
estimate a speed of the vehicle and a rate of change of the speed of the vehicle via a vehicle speed sensor;
estimate a pitch energy of the vehicle over a threshold distance based on the estimated longitudinal acceleration and the rate of change of the speed of the vehicle;
estimate a roll energy of the vehicle over the threshold distance based on the estimated latitudinal acceleration, the yaw rate, and the speed of the vehicle;
estimate a road roughness index (RRI) based on the estimated pitch energy and roll energy; and
in response to the RRI being higher than a threshold, selectively deactivating one or more engine cylinders via a variable displacement engine (VDE) mechanism while maintaining combustion in remaining engine cylinders.

17. The system of claim 16, wherein the controller includes further instructions to:
estimate a first speed of a first wheel via a first wheel speed sensor;
estimate a second speed of a second wheel via a second wheel speed sensor;
estimate a third speed of a third wheel via a third wheel speed sensor;
estimate a fourth speed of a fourth wheel via a fourth wheel speed sensor; and
estimate a first absolute wheel speed deviation energy, a second absolute wheel speed deviation energy, a third absolute wheel speed deviation energy, and a fourth absolute wheel speed deviation energy based on the first speed, the second speed, the third speed, and the fourth speed, respectively.

18. The system of claim 17, wherein the RRI is estimated as a weighted average of each of the pitch energy, the roll energy, the first absolute wheel speed deviation energy, the second absolute wheel speed deviation energy, the third absolute wheel speed deviation energy, and the fourth absolute wheel speed deviation energy.

* * * * *